(12) United States Patent  (10) Patent No.: US 8,463,190 B2
Bhadra et al.  (45) Date of Patent: Jun. 11, 2013

(54) SYSTEM AND METHOD FOR INTERFERENCE REDUCTION IN SELF-OPTIMIZING NETWORKS

(75) Inventors: Sandeep Bhadra, Addison, TX (US); Minghua Fu, Plano, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 573 days.

(21) Appl. No.: 12/660,427

(22) Filed: Feb. 26, 2010

(65) Prior Publication Data

US 2010/0216405 A1 Aug. 26, 2010

Related U.S. Application Data

(60) Provisional application No. 61/155,600, filed on Feb. 26, 2009.

(51) Int. Cl.
*H04B 1/00* (2006.01)

(52) U.S. Cl.
USPC .... 455/63.1; 455/450; 455/452.1; 455/67.11; 455/67.14; 455/436; 455/442; 370/331; 370/342; 370/347; 370/337; 375/267; 709/208

(58) Field of Classification Search
USPC ............... 455/63.1, 450, 452.1, 452.2, 67.11, 455/67.14, 436, 442; 370/331, 337, 342, 370/347; 709/208; 375/267
See application file for complete search history.

(56) References Cited

U.S. PATENT DOCUMENTS

| | | | | |
|---|---|---|---|---|
| 6,760,599 B1 * | 7/2004 | Uhlik | | 455/525 |
| 6,807,426 B2 * | 10/2004 | Pankaj | | 455/453 |
| 7,406,065 B2 * | 7/2008 | Willenegger et al. | | 370/335 |
| 7,483,704 B2 * | 1/2009 | Shimada et al. | | 455/453 |
| 7,751,843 B2 * | 7/2010 | Butala | | 455/522 |
| 7,756,483 B2 * | 7/2010 | Chang et al. | | 455/67.13 |
| 7,903,770 B2 * | 3/2011 | Levin et al. | | 375/346 |
| 7,978,673 B1 * | 7/2011 | Uhlik et al. | | 370/341 |
| 8,032,145 B2 * | 10/2011 | Ji | | 455/450 |
| 8,072,918 B2 * | 12/2011 | Muharemovic et al. | | 370/319 |
| 8,098,637 B1 * | 1/2012 | Tewfik | | 370/338 |
| 8,121,079 B2 * | 2/2012 | Geng et al. | | 370/329 |
| 8,170,047 B2 * | 5/2012 | Andersen et al. | | 370/442 |
| 8,259,637 B2 * | 9/2012 | Bertrand et al. | | 370/315 |
| 2009/0042594 A1 * | 2/2009 | Yavuz et al. | | 455/522 |
| 2009/0042596 A1 * | 2/2009 | Yavuz et al. | | 455/522 |
| 2009/0082026 A1 * | 3/2009 | Yavuz et al. | | 455/446 |
| 2009/0135790 A1 * | 5/2009 | Yavuz et al. | | 370/336 |
| 2009/0137221 A1 * | 5/2009 | Nanda et al. | | 455/296 |
| 2009/0137241 A1 * | 5/2009 | Yavuz et al. | | 455/423 |
| 2009/0175214 A1 * | 7/2009 | Sfar et al. | | 370/315 |
| 2009/0252099 A1 * | 10/2009 | Black et al. | | 370/329 |
| 2009/0280819 A1 * | 11/2009 | Brisebois et al. | | 455/446 |

* cited by examiner

*Primary Examiner* — Marceau Milord
(74) *Attorney, Agent, or Firm* — Ronald O. Neerings; Wade James Brady, III; Frederick J. Telecky, Jr.

(57) ABSTRACT

A method for interference management in a self optimizing network includes determining quality of service constraints for a call; mapping the quality of service constraints for the call to a target signal-to-interference noise ratio; and transmitting power control signals for the call based on the target signal-to-interference noise ratio. The utility function can be optimized for each class of calls over the network so as to maximize the total number of calls that can be handled.

16 Claims, 4 Drawing Sheets

US 8,463,190 B2

SYSTEM AND METHOD FOR INTERFERENCE REDUCTION IN SELF-OPTIMIZING NETWORKS

RELATED APPLICATIONS

The present application claims priority to provisional Patent Application Ser. No. 61/155,600 filed Feb. 26, 2009, the disclosure of which is incorporated by reference herein, in its entirety.

BACKGROUND

1. Field

The present invention relates generally to communications networks, and more particularly to self-optimizing networks.

2. Description of Related Art

As demand for wireless access to the Internet and Internet-based services is expanding, competitive advantages in the mobile business can be gained by offering enhanced user experience through cost effective broadband mobile access. A promising approach is to maximize total performance of networks, i.e., provide not only wireless access with higher performance but also more efficient operation and maintenance. The Self Optimizing Network (SON) introduced as part of the 3GPP Long Term Evolution (LTE) is one approach for improving wireless networks. It aims to reduce the cost of installation and management by simplifying operational tasks through automated mechanisms such as self-configuration and self-optimization. The challenge faced by mobile operators is to ensure that mobile services are of a high quality while reducing capital expenditures and operational expenditures of complex radio access networks (RANs). Using an SON can remove several human interventions from network operations and maintenance.

Self-optimizing and self-healing architectures improve user perceived qualities by mitigating quality degradations that result from inaccuracies of the planning or equipment faults as early as possible and by optimizing the network parameters under interference and overload conditions.

One area of particular interest for SONs is that of interference management. In addition to one or more evolved Node B (eNodeB or eNB) (also known as macro cells) within the network, typical SONs can also include Home eNBs. Introducing home eNodeBs (also known as femtocells) significantly increases the number of base stations in the network and it also means that the network operator has less control of the nodes. Therefore, there is a need for self-configuration of home eNodeBs. For example, a major challenge is the interference between home eNodeBs and macro cells and interference between home eNodeBs in close proximity to each other. Therefore, there is a need to authenticate and identify the location of the home eNodeB before authorizing it to transmit in the licensed radio spectrum. The home eNodeBs also sniff the configuration information broadcast by the surrounding macro cells, and select appropriate physical cell IDs, location area IDs, etc.

In a heterogeneous network such as this, a mobile user device (UE) cannot always simply move to a cell with the best channel characteristics. Thus there remains a need, currently unmet by the present art, to provide interference management easily and effectively within a SON environment.

BRIEF SUMMARY

Embodiments of the present invention relate to a method for interference management in a self optimizing network includes determining quality of service constraints for a call; mapping the quality of service constraints for the call to a target signal-to-interference noise ratio; and transmitting power control signals for the call based on the target signal-to-interference noise ratio. This application of controlling transmit power control can apply to both on the uplink (mobile UE to (H)eNB) and the downlink ((H)eNB to UE). The utility function can be optimized for each class of calls over the network so as to maximize the total number of calls that can be handled.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
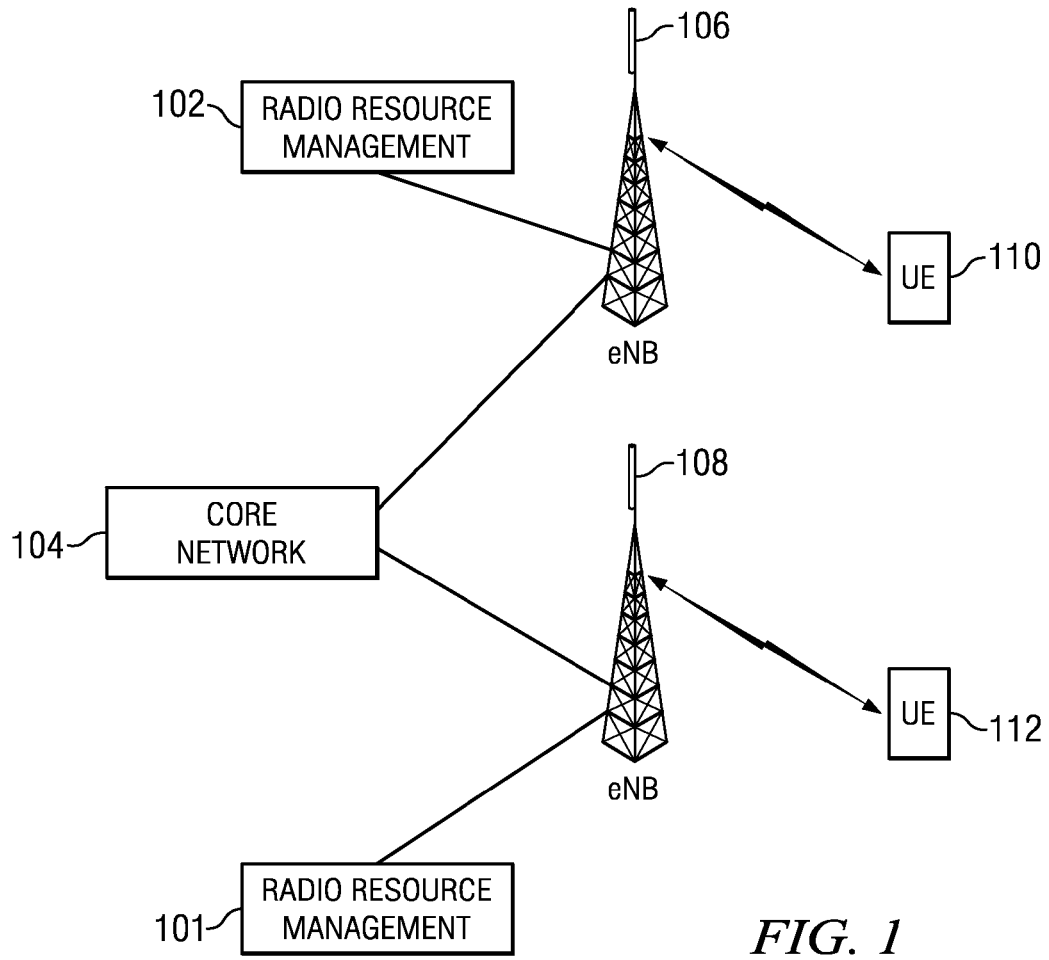
FIG. 1 depicts an exemplary SON in accordance with the principles of the present invention.

FIG. 1 depicts an exemplary SON in accordance with the principles of the present invention. There is a core network that provides communication services to the user equipment 110, 112. In particular, these communication services can include both voice service and data service. As such there can be difference in Quality of Service (QoS) requirements depending on the services being utilized by the user equipment 110, 112. As shown, the core network 104 is coupled with eNBs 106, 108 to provide a wide coverage area.

Although only two eNBs are depicted in FIG. 1, one of ordinary skill will appreciate that there can be a large number of these base stations arranged so as to provide cellular coverage to a very large service area. As the user equipment 110, 112 travels between the different cells various call handling functions (e.g., handover, load balancing, intercell interference coordination) will be coordinated between the different eNBs 106, 108. Although shown as eNBs in FIG. 1, these bases stations 106, 108 can include home eNBs as well.

One function that each of the eNBs 106, 108, respectively, is responsible for performing is that of interference management, which is typically contained as part of the Radio Resource Management functionality, 101, 102, included within the eNBs, respectively. There is both uplink interference and downlink interference experienced by the user equipment 110, 112. Typically, this interference is inter-cell interference, resulting from the jamming of signals from the transmitter in one cell, to that of another. Power levels of signals being transmitted (either by the eNB or user equipment) can be controlled to enforce certain signal to interference noise ratio (SINR) requirements.

Figure 2:
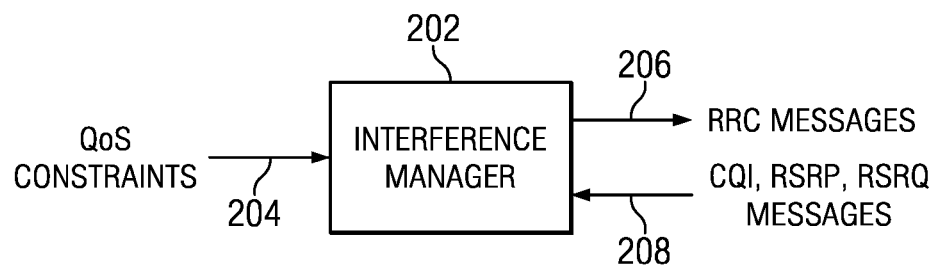
FIG. 2 depicts a block diagram of the major functional blocks of providing interference management by the radio resource management modules 101, 102 of FIG. 1.

FIG. 2 depicts a block diagram of the major functional blocks of providing interference management by the radio resource management modules 101, 102 of FIG. 1. An interference manager 202 receives various inputs and provides various control functions so as to reduce interference experienced by user equipment 110, 112 utilizing the core network 104. The interference manager 202 can, for example, be a combination of programmable hardware and software that implements an algorithm for receiving input signals and information and then calculating radio resource control messages as output.

Thus, referring to FIG. 2, the interference manager 202 receives QoS constraints 204 that must be satisfied for different communication channels being used. The interference manager 202 also receives measurements 208 of signal quality over the physical communication layer. For example, three typical signals can include channel quality indication (CQI), reference signal received power (RSRP), and reference signal received quality (RSRQ). These signals can be used by the interference manager 202 to evaluate the interference being experienced for a particular call. In response, the interference manager generates a radio resource control (RRC) messages that allow the eNBs to coordinate signal parameters that satisfy the users' QoS requirements. The control messages can, for example, be transmission power level indications in either the uplink direction or the downlink direction.

Figure 3:
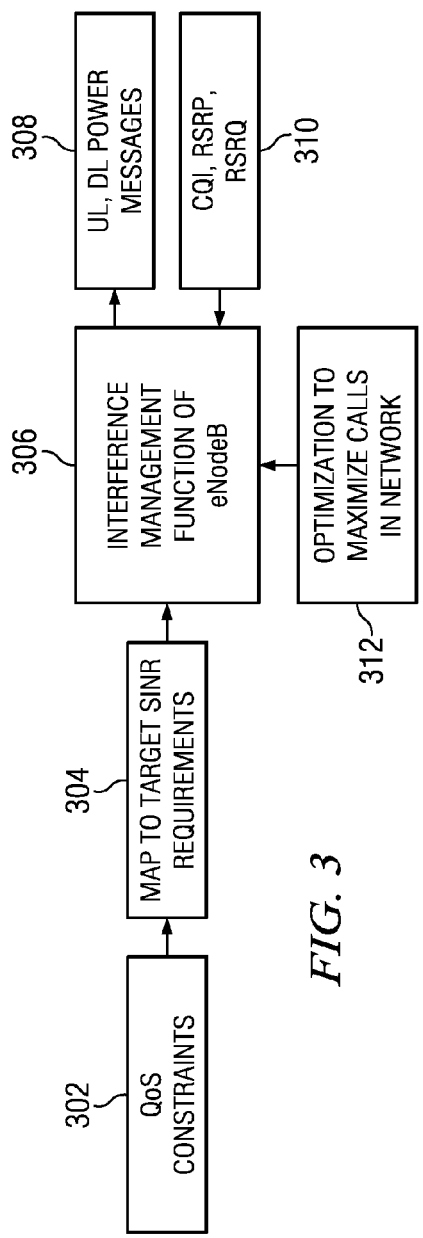
FIG. 3 depicts a functional flowchart of providing interference management within an eNodeB according to the principles of the present invention.

FIG. 3 depicts a functional flowchart of providing interference management within an eNodeB according to the principles of the present invention. As discussed with respect to FIG. 2, there are QoS constraints 302 that dictate the QoS requirements for a particular user or a particular call. In accordance with the principles of the present invention, these QoS constraints 302 are mapped 304 to target SINR requirements. In other words, the QOS requirements are converted to terms of what the target SINR of a communications link would be that satisfies those QoS constraints. It is then these SINR requirements that are provided to the interference manager 306 of the eNB. Utilizing the channel quality measurements 310, the interference manager 306 produces uplink and downlink power messages 308 to achieve the SINR requirements. One additional component, discussed in more detail later, is an optimization step 312 that can be used to optimize the interference manager 306 so as to maximize the number of calls (data, voice, other user services) in a network while achieving the SINR requirements of each call.

Figure 4:
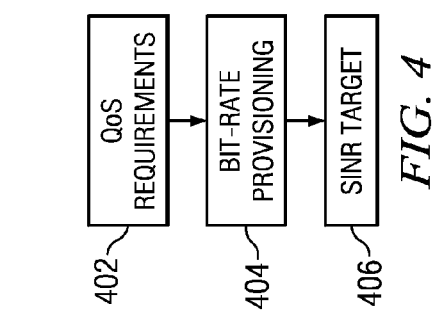
FIG. 4 depicts an exemplary method of mapping QoS constraints to target SINR requirements in accordance with the principles of the present invention.

FIG. 4 depicts an exemplary method of mapping QoS constraints to target SINR requirements in accordance with the principles of the present invention. Typically there are various QoS levels (e.g., $q_1, q_2, q_3, \ldots$) that can be defined by a set of attributes such as bit rate, delay, and packet loss rate. For example, one QoS level can be characterized by a particular bit rate, a particular packet delay budget (e.g., <50 ms, 90 ms, 250 ms, etc.) and a particular packet loss rate (e.g., $10^{-1}$, $10^{-3}$, $10^{-6}$, etc.) while another QoS level will have different values for these attributes. The QoS levels are designed with a particular type of service in mind (e.g., video, gaming, voice, etc. Utilizing these parameters, provisioning can be determined to achieve a desired SINR 406. In provisioning, the eNB allocates modulation schemes and physical resource blocks that will achieve the target SINR. A physical resource block is defined as a certain number of consecutive orthogonal frequency divisional multiplexing (OFDM) symbols in the time domain or a certain number of consecutive subcarriers in the frequency domain.

One method for performing the bit rate provisioning of step 404 is to use a technique called effective bandwidth that maps a QoS constraint (required bit rate, delay and packet error rate) into a bit rate provisioning. To go from a provisioned bit rate (404) to a target SINR (406), the radio resource manager uses as input the number of physical resource blocks (PRBs) available. Once the RRM knows the number of PRBs available and the provisioned bit rate (404), it can quickly calculate the required modulation and coding scheme (MCS) required to support the given provisioned bit rate for the call within the number of PRBs available for the call. Since there is already a direct relationship between the MCS required and the SINR required to support the call, once the MCS is calculated, the target SINR can be computed. One of ordinary skill will recognize that there are known alternative way to accomplish the computation of the target SINR. The step of mapping the QoS constraints into a bit rate provisioning is new in the context of interference management for cellular networks.

Figure 5:
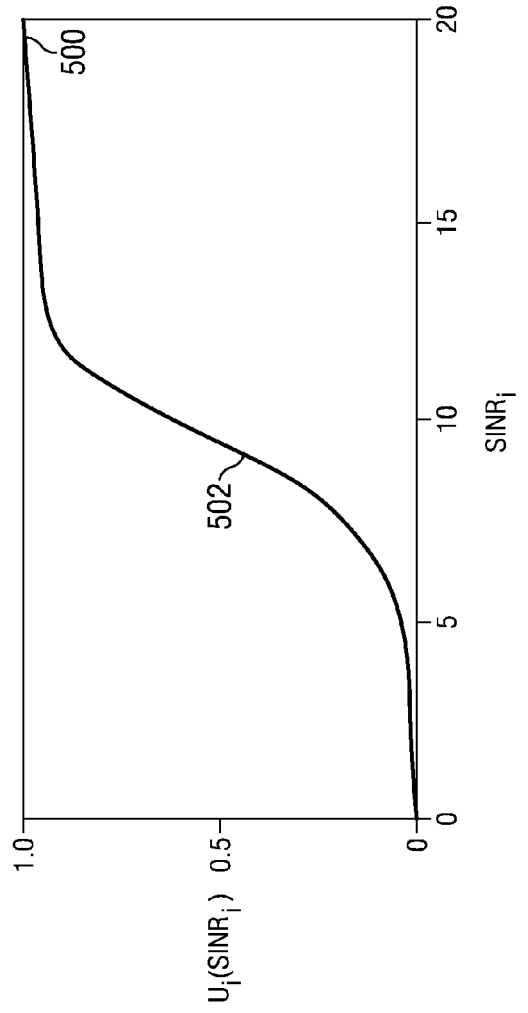
FIG. 5 shows a sigmoid utility function 500 that can be modified to be used with different classes of calls in accordance with the principles of the present invention.

As shown in FIG. 3, another input to the interference manager 306 is the optimization function 312. In accordance with the principles of the present invention, a distributed utility algorithm is used to control the interference manager 302. FIG. 5 shows a sigmoid utility function 500 that can be modified to be used with different classes of calls in accordance with the principles of the present invention. Generally, QoS depends on the SINR so FIG. 5 shows a utility function U (y-axis) that is a function of SINR (x-axis). Some characteristics are that $U_i(0)=0$ and $U_i(\infty)=1$ and that $U_i$ increases as $SNIR_i$ increases, where I is the index for user i. This means that a user is more satisfied with the service as the quality improves. Each interference management algorithm (see step 306 of FIG. 3) essentially tries to maximize a net utility, where net utility is defined as $U_i(SINR_i)-Cost$.

The $U_i$ may be, for example, as given in FIG. 5 and the Cost may be, for example, a value proportional to the transmitted power by the ith call.

Also, the slope 502 of the sigmoid can be changed based on the level of the call. For example, the steeper the slope, the more important the call (or the higher the QoS constraint). The utility functions applied to each class of call are optimized so as to maximize the number of calls on the network. Utilizing the QoS to SINR mapping and the optimal utility functions, the interference manager can control the uplink and downlink power control signals generated by the eNB.

The sigmoid utility function is provided by way of example; however, one of ordinary skill will appreciate that different utility functions can be used as well to maximize the number of calls on a network.

Figure 6:
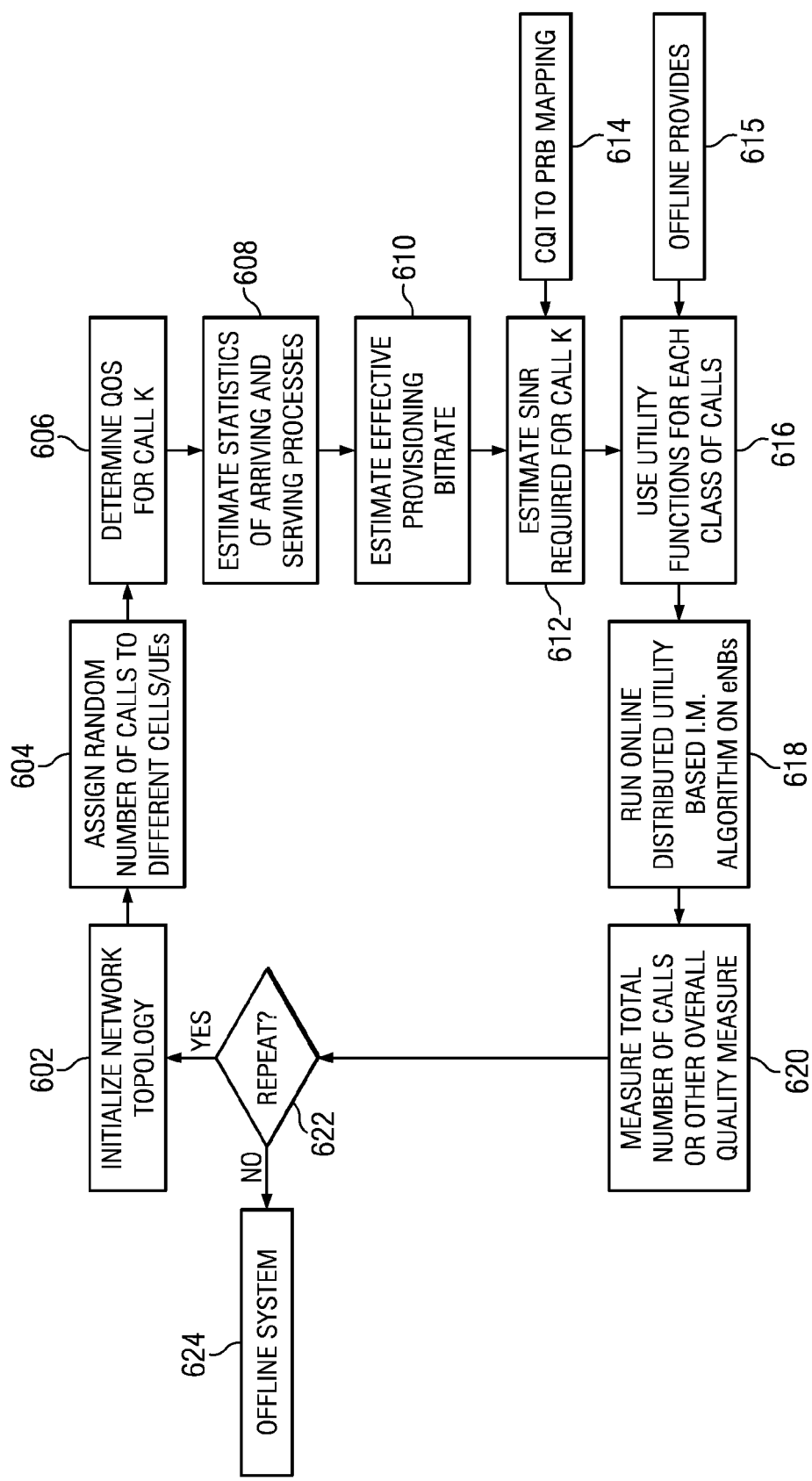
FIG. 6 and FIG. 7, when taken in conjunction, depict a flowchart of an exemplary method of providing online interference management and offline optimization of utility functions, in accordance with the principles of the present invention.
Figure 7:
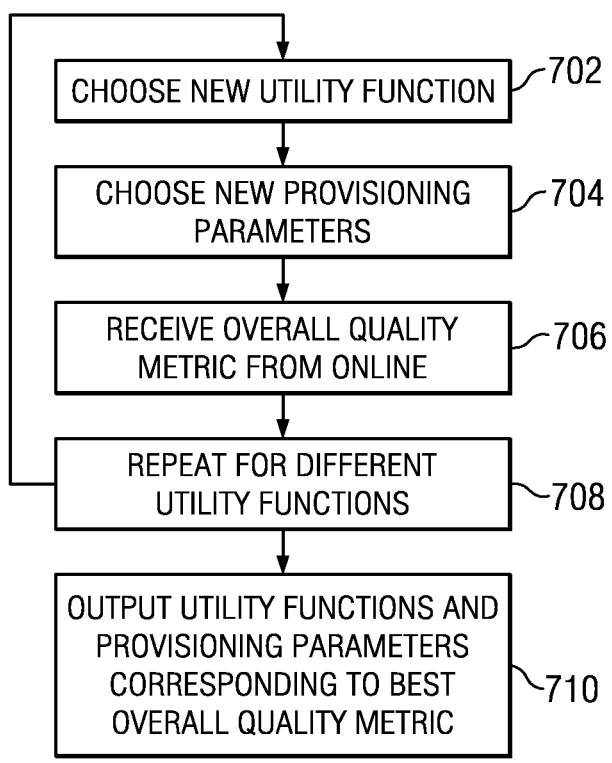

FIG. 6 and FIG. 7, when taken in conjunction, depict a flowchart of an exemplary method of providing online interference management and offline optimization of utility functions, in accordance with the principles of the present invention. In particular, they describe a method of optimizing the utility functions for each class of calls.

The flowchart begins in step 602 by initializing a network topology of user equipment and eNBs. The network topologies reflect how different network elements are connected. In step 604, calls are assigned to different cells and user equipment; in particular the calls have different levels or classes. Next in step 606, the QoS for each call k is determined so that the arriving and serving processes for that call can be evaluated (step 608) and an estimated provisioning bit rate can be determined (step 610). As discussed with reference to FIG. 3, a CQI to physical resource block mapping 614 to estimate a target SINR for the call k (step 612). In step 616, one or more utility functions (e.g., the function of FIG. 5) are provided to the interference manager to respectively apply to the different classes of calls. These functions can be determined and provided by an offline system 615 but locally stored with the interference manager functional module. Based on the SINR targets and the utility functions, each eNB can generate, in step 618, appropriate uplink and downlink power control signals. In other words, performing step 618 involves using the utility functions, so that each eNB runs an online distributed utility based algorithm (which is the interference management algorithm) to independently figure out what the appropriate uplink and downlink power control signals should be. Thus, step 618 is essentially the same as step 306 of FIG. 3. By basing, at least in part, the "Cost" in the utility function equation the eNBs cooperate to manage interference even when acting in their own self interest. In 620, an overall quality measurement is calculated. For example, one overall quality measurement would be the total number of all calls of all classes, or a weighted sum of the number of calls from each class, with appropriate weighting. The higher this value is, the better intercell interference has been managed.

In step 622, the flowchart can be repeated for different network topologies until all topologies have been tried. The results of the different iterations can be provided to an offline system in step 624.

FIG. 7 depicts a flowchart of an exemplary method of iteratively determining optimal utility functions and other provisioning parameters. In step 702, the various utility functions are selected for a particular trail and supplied to the online system. Using the particular function of FIG. 5, this would entail changing the sigmoid slope for each class of call being handled. Next in step 704, the provisioning parameters are chosen. These parameters can include parameters such as the number of physical resource blocks allocated to the call, or the weight allocated to calls of one class over another, but one of ordinary skill will recognize that other parameters could be used in addition to these or as alternatives.

Next, in step 706, the overall quality metric from step 624 is received. At this point, the steps can be repeated 708 for different utility functions and different provisioning parameters. Once all the iterations are complete, then there is enough information to identify the utility functions and provisioning parameters that provide the best overall quality measurement. Once determined, this information can be distributed to eNBs so that the interference managers can implement interference management utilizing such information.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Also, the term "exemplary" is meant to indicate that some information is being provided as an example only as is not intended to mean that that information is somehow special or preferred. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
    a) selecting a respective utility function for each class of calls occurring over a network;
    b) selecting a respective set of provisioning parameters for each class of calls occurring over the network;
    c) determining an overall quality measurement for the respective utility functions and respective provisioning parameters;
    d) repeating steps a)-c) with different respective utility functions and different respective provisioning parameters; and
    e) comparing the overall quality measurement from each iteration of step c); and
    f) determining the respective utility functions and respective provisioning parameters resulting in a highest overall quality measurement.

2. The method of claim 1, wherein the step of determining an overall quality measurement includes:
    assigning a first number of calls of a first class to a plurality of cells of the network;
    assigning a second number of calls of a second class to the plurality of cells of the network;
    estimating a target signal to interference noise ratio for each call of the first and second number of calls;
    applying the respective utility function selected for each call to generate power control signals based on the target signal to interference noise ratio;
    and calculating a total number of calls occurring over the network.

3. The method of claim 2, further comprising: repeating the step of determining the overall quality measurement for each of a plurality of different network topologies.

4. The method of claim 2, wherein the step of estimating further includes:
    determining a set of quality of service constraints for a particular call;
    determining estimated provisioning parameters for the particular call based, in part, on the set of quality of service constraints; and
    mapping the estimated provisioning parameters to the target signal to interference noise ratio.

5. The method of claim 4, further comprising:
transmitting power control signals for the call based on the target signal-to-interference noise ratio.

6. The method of claim 5, wherein the power control signals include an uplink power control signal.

7. The method of claim 5, wherein the power control signals include a downlink power control signal.

8. The method of claim 5, further comprising:
applying a utility function to the target signal-to-interference noise ratio; and
generating the power control signals based on the utility function and the target signal-to-interference noise ratio.

9. The method of claim 8, wherein the utility function is configured to maximize a number of calls on a network.

10. The method of claim 8, further comprising:
determining a class of the call; and
selecting the utility function based on the class of the call.

11. The method of claim 10, wherein the utility function is a sigmoid utility function.

12. The method of claim 11, wherein a slope of the sigmoid function is selected based on the class of the call.

13. The method of claim 5, further comprising: receiving channel quality indicators for a channel of the call.

14. The method of claim 13, wherein the power control signals are based, in part, on the channel quality indicators.

15. The method of claim 5, wherein estimating the bit rate provisioning parameters is based, at least in part, on a packet delay rate and a packet loss rate associated with the quality of service constraints.

16. The method of claim 15, wherein the estimated bit rate provisioning parameters includes at least one of:
a modulating scheme; and
a particular number of physical resource blocks.

* * * * *